United States Patent
Istas et al.

(10) Patent No.: US 7,591,446 B2
(45) Date of Patent: Sep. 22, 2009

(54) SWIVEL BRACKET SYSTEM

(75) Inventors: Kenneth E. Istas, El Dorado, KS (US); Allen D. Gerdes, Andover, KS (US); Eric Victor Paubel, Andover, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 0 days.

(21) Appl. No.: 11/780,528

(22) Filed: Jul. 20, 2007

(65) Prior Publication Data

US 2008/0087783 A1 Apr. 17, 2008

Related U.S. Application Data

(60) Provisional application No. 60/829,166, filed on Oct. 12, 2006.

(51) Int. Cl.
*A47F 5/00* (2006.01)
(52) U.S. Cl. ............... 248/288.11; 248/288.31; 248/558; 403/77; 403/131
(58) Field of Classification Search ............ 248/288.11, 248/288.31, 181.1, 481, 482, 484, 558; 403/56, 403/263, 131, 141, 260, 152, 74, 44
See application file for complete search history.

(56) References Cited

U.S. PATENT DOCUMENTS

| | | | | |
|---|---|---|---|---|
| 1,460,697 A | * | 7/1923 | Bendlin | 248/276.1 |
| 2,500,048 A | | 3/1950 | Stoiber | |
| 2,638,299 A | * | 5/1953 | Berenice | 248/181.1 |
| 2,950,836 A | * | 8/1960 | Murdock | 220/576 |
| 3,530,495 A | * | 9/1970 | Kindel | 403/140 |
| 4,036,459 A | | 7/1977 | Alexander et al. | |
| 4,194,850 A | * | 3/1980 | Cranmore | 403/140 |
| 4,374,497 A | * | 2/1983 | Harmand | 108/4 |
| 4,647,434 A | * | 3/1987 | Ayers et al. | 422/144 |
| 4,928,914 A | | 5/1990 | Snodell | |
| 4,974,802 A | * | 12/1990 | Hendren | 248/181.1 |
| 5,116,159 A | * | 5/1992 | Kern et al. | 403/132 |
| 5,290,120 A | * | 3/1994 | Osterfeld et al. | 403/133 |
| 5,641,191 A | | 6/1997 | Jia | |
| 5,642,956 A | * | 7/1997 | Hale | 403/122 |
| 5,881,514 A | | 3/1999 | Pryor | |
| 6,010,102 A | | 1/2000 | Dillion, Jr. | |
| 6,220,556 B1 | * | 4/2001 | Sohrt et al. | 248/279.1 |
| 6,328,270 B1 | * | 12/2001 | Elberbaum | 248/288.31 |
| 6,361,261 B1 | * | 3/2002 | Gattone et al. | 411/526 |
| 6,585,201 B1 | * | 7/2003 | Reed | 248/181.1 |
| 6,588,719 B1 | | 7/2003 | Tubach | |
| 6,685,147 B1 | * | 2/2004 | Ma | 248/139 |
| 6,793,108 B2 | * | 9/2004 | Williams, Jr. | 224/401 |
| 6,935,883 B2 | | 8/2005 | Oddsen, Jr. | |
| 7,059,565 B2 | | 6/2006 | Scown et al. | |
| 7,100,881 B2 | * | 9/2006 | Worrall | 248/278.1 |

* cited by examiner

*Primary Examiner*—Anita M King
(74) *Attorney, Agent, or Firm*—Hovey Williams LLP

(57) ABSTRACT

A bracket comprises a support base configured to be attached to a frame or other structural member of an aircraft; a component base configured to be attached to an ECS duct or other component to be supported on the structural member; and intermediate structure for joining the support base to the component base. The intermediate structure permits relative motion between the component base and the frame base in nearly all directions so that the component may be positioned in nearly any desired orientation relative to the structural member.

4 Claims, 8 Drawing Sheets

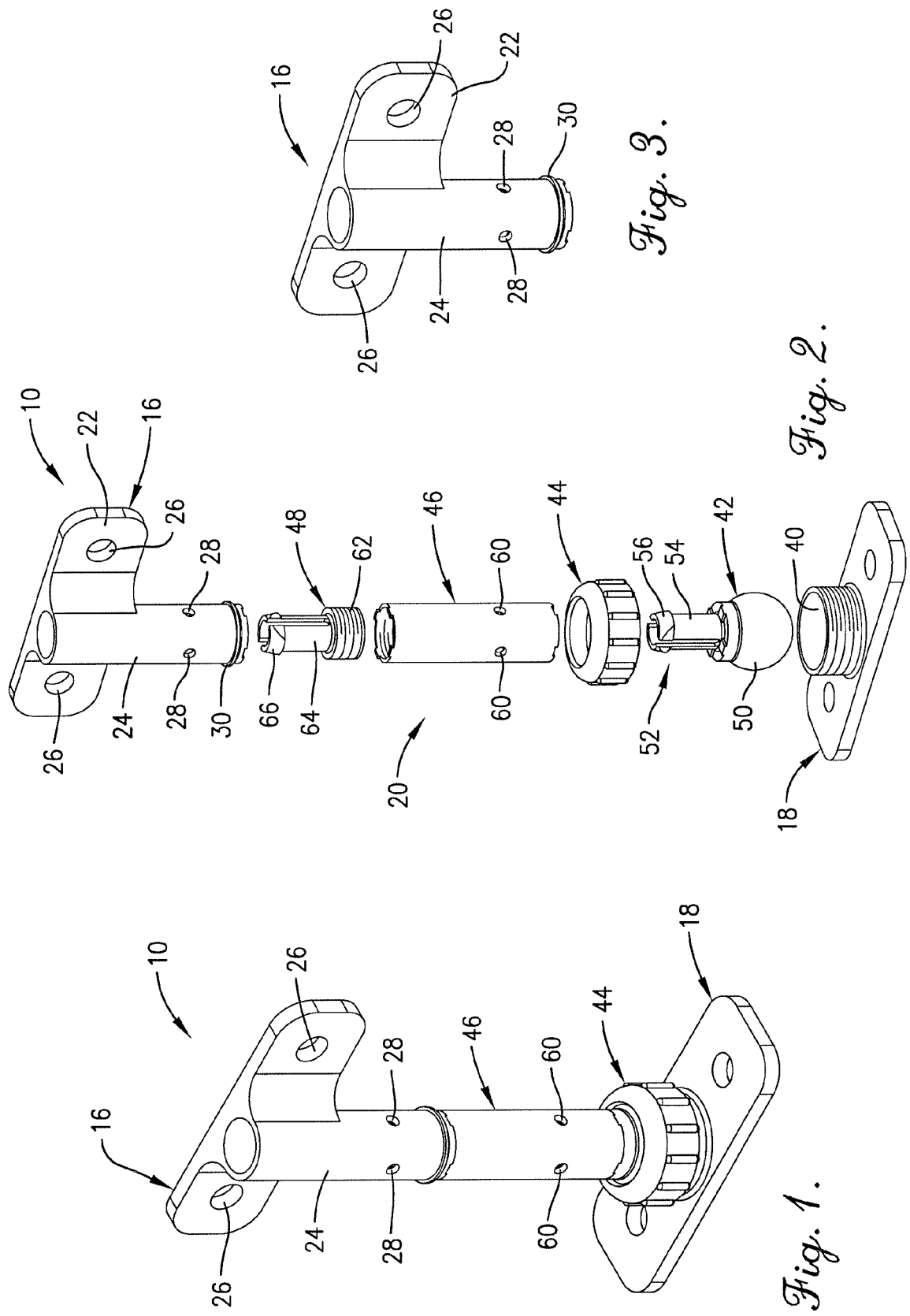

SWIVEL BRACKET SYSTEM

RELATED APPLICATION

This non-provisional application claims the benefit of U.S. Provisional Application Ser. No. 60/829,166, entitled "SWIVEL BRACKET SYSTEM," filed Oct. 12, 2006. The identified provisional application is incorporated herein by specific reference.

BACKGROUND

1. Field

The present invention relates to aircraft components. More particularly, the invention relates to brackets for supporting environmental control system (ECS) ducts and other components to the frames or other structural members of aircraft fuselages.

2. Description of the Related Art

Modern aircraft have a variety of components such as ECS ducts, wiring, and insulation supported to their fuselage frames. These components are typically supported with specially configured brackets made of aluminum or other metals. Installing these brackets can be time consuming and costly because different portions of an aircraft require different brackets, thus necessitating the use of a multitude of different bracket types. Another problem with conventional brackets is that they cannot support ECS ducts and other components at odd angles, thus necessitating the use of additional brackets or other type fasteners in many applications.

Recently, aircraft manufacturers have begun to form fuselages and other components out of composite materials rather than aluminum to reduce aircraft weight. The use of composite materials to form aircraft fuselages presents additional problems with conventional aluminum and other metal brackets, because metal brackets tends to corrode when exposed to some composite materials. Metal brackets also add undesirable and unnecessary weight to an aircraft.

Accordingly, there is a need for an improved bracket that overcomes the limitations described above.

SUMMARY

The present invention solves the above-described problems and provides a distinct advance in the art of brackets for mounting aircraft components. More particularly, the present invention provides a bracket which can be configured to support just about any type of aircraft component at nearly any orientation and that is lightweight and not subject to corrosion.

One embodiment of the bracket comprises a support base configured to be attached to a frame or other structural member of an aircraft; a component base configured to be attached to an ECS duct or other component to be supported on the structural member; and intermediate structure for joining the support base to the component base. The intermediate structure permits relative motion between the component base and the frame base in nearly all directions so that the component may be positioned in nearly any desired orientation relative to the structural member of the aircraft. This allows a single bracket type to be used and adjusted to support just about any component in nearly any orientation, thus eliminating the need for a myriad of differently configured brackets. The bracket also includes components which may be used and/or combined in various manners to accommodate nearly any component mounting requirement. Again, this allows a single bracket type to be used for almost any mounting application.

All of the components of the bracket are preferably made of lightweight and corrosion-resistant thermoplastic to reduce weight and to prevent corrosion, even when the brackets are used to support components to a fuselage formed of composite materials.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is an isometric view of a bracket constructed in accordance with an embodiment of the invention.

FIG. 2 is an exploded view of the bracket of FIG. 1.

FIG. 3 is an isometric view of a support base of the bracket of FIG. 1.

Figure 6:
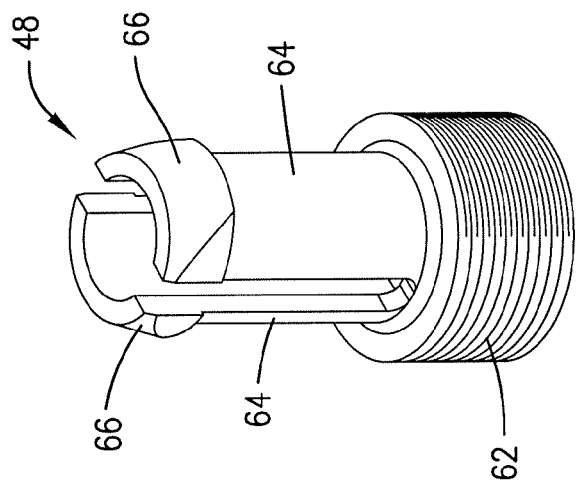
FIG. 6 is an isometric view of a stem bayonet of the bracket of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 16:
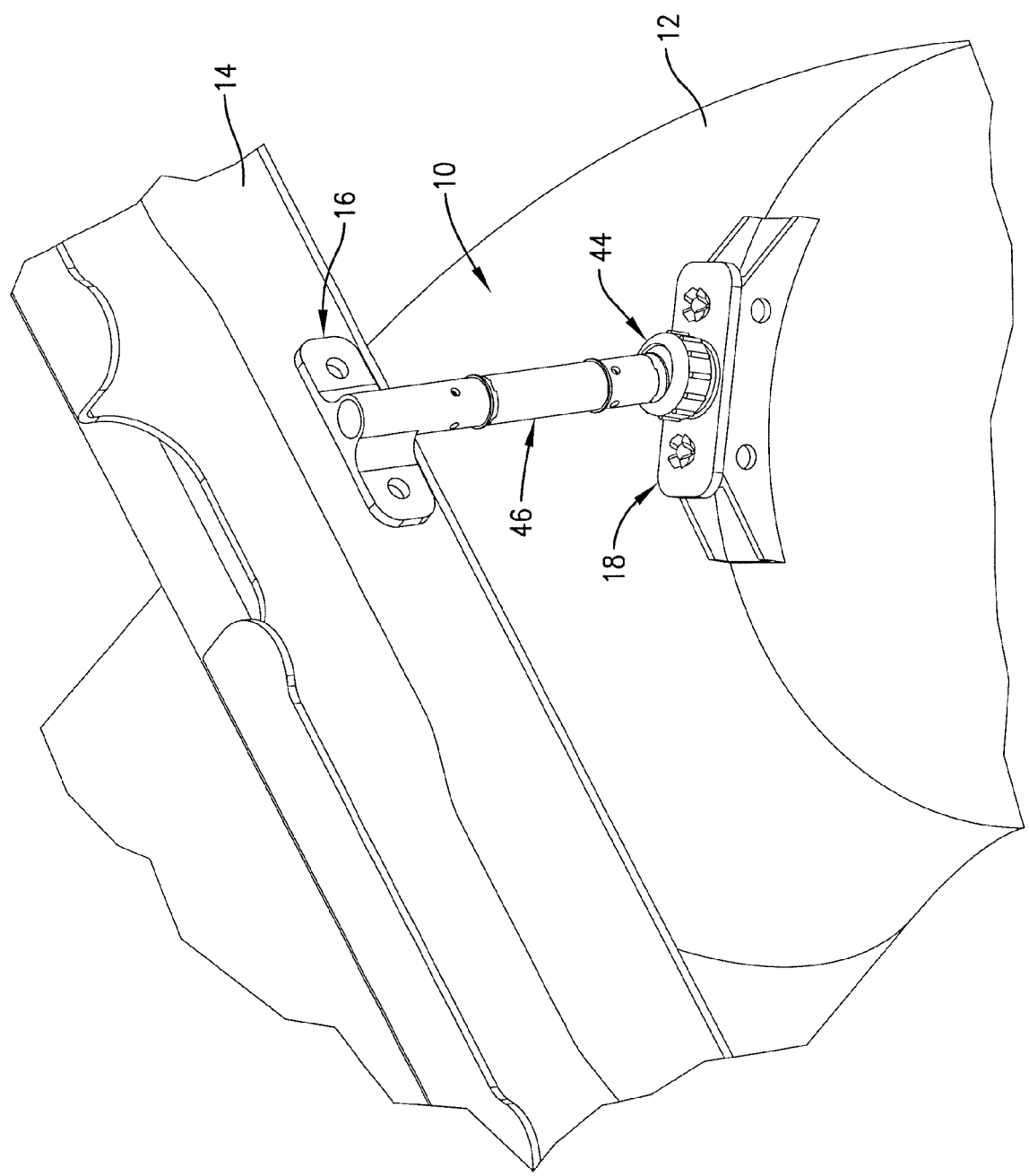
FIG. 16 is a perspective schematic view depicting attachment of the bracket of FIG. 1 between a support member of an aircraft and a ECS duct or other component.

Turning now to the drawing figures, and particularly FIGS. 1-7, a bracket 10 constructed in accordance with an embodiment of the invention is illustrated. As shown in FIG. 16, the bracket 10 is configured for supporting a component 12 such as an ECS duct, wiring, insulation, or any other device from an aircraft support member 14. As best shown in FIG. 2, the exemplary bracket 10 broadly includes a support base 16, a component base 18, and an intermediate structure 20 joining the support base and component base. The bracket components are preferably injection molded of thermoplastic material to minimize their weight and to prevent corrosion when used to attach components to aircraft formed of composite materials.

The support base 16 is best illustrated in FIG. 3 and is configured to be attached to an aircraft frame or other structural member such as a circumferentially extending rib or longitudinally extending stringer. The support base 16 includes a generally rectangular shaped mounting plate 22 and a tubular post 24 depending from one side of the mounting plate. The mounting plate may be approximately 2"-2½" long, ½"-1" wide, and 1/16"-¼" thick and may have rounded corners; however, it may be formed in other shapes and sizes without departing from the scope of the invention. One or more holes 26 may be formed in the mounting plate for receiving rivets, screws, wing nuts, or other fasteners which may be inserted into corresponding holes drilled or otherwise formed in the structural member to which the mounting plate is attached.

The tubular post 24 is integrally formed to the rear face of the mounting plate 22 and has a longitudinal axis which is generally transverse to the longitudinal axis of the mounting plate. The tubular post may be between ½"-3" long, 0.3"-0.7" in external diameter, and 0.2"-0.4" in internal diameter; however, it may be formed in other shapes and sizes without departing from the scope of the invention. The lower end of the post is open to define a socket for receiving a snap-fit connector as described below. A retaining ridge (not shown) is formed in the interior wall of the post for retaining the snap-fit connector also as described below. The post 24 includes several small holes 28 just above the retaining ridge and extending between the post's outer and inner circumferential walls through which a tool may be inserted for releasing the snap-fit connector from the retaining ridge as described below. The lower edge of the post may be notched, the purpose of which is described below. A circumferential ridge or lip 30 may be formed on the post for engaging an insulation blanket retainer.

Figure 5:
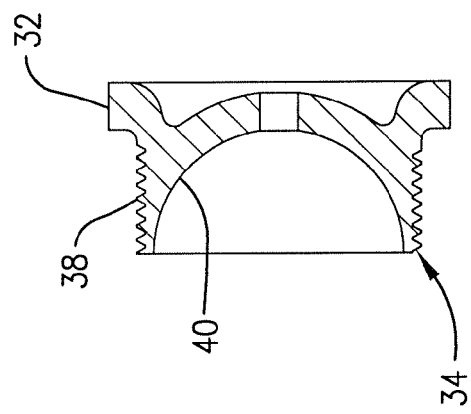
FIG. 5 is a side view in partial section of the component base of FIG. 4.
Figure 4:
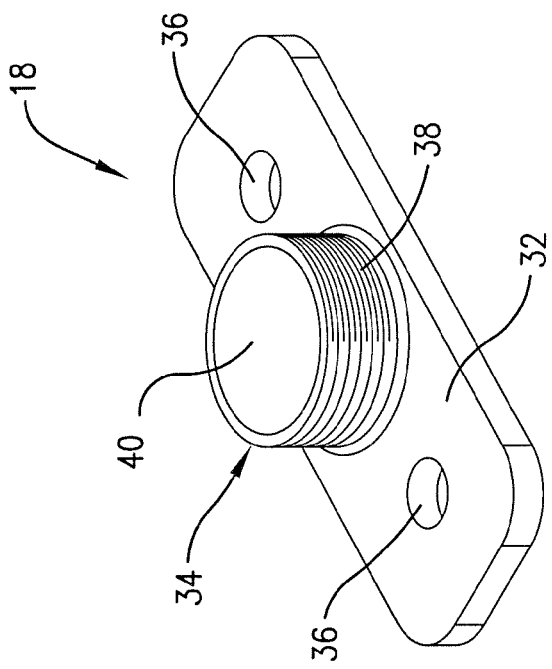
FIG. 4 is an isometric view of a component base of the bracket of FIG. 1.

The component base 18 is best illustrated in FIGS. 4 and 5 and includes a generally rectangular shaped mounting plate 32 and a socket 34 extending from one face thereof. The mounting plate 32 is preferably approximately 2"-2½" long, ½"-1" wide, and 1/16"-¼" thick with rounded corners; however, it may be formed in other shapes and sizes without departing from the scope of the invention. One or more holes 36 may be formed in the mounting plate for receiving a hose saddle, zip ties, rivets, screws, wing nuts, or other fasteners which may be used to secure a component such as an ECS duct to the component base.

The socket 34 is defined by an upstanding circular wall 38 integrally formed on the top face of the mounting plate 32. The socket has a spherical or curved inner surface 40 for receiving a spherical ball connector as described below. The upstanding circular wall 38 preferably extends between ¼"-½" above the top face of the mounting plate and has a diameter of approximately ½"-¾"; however, it may be formed in other shapes and sizes without departing from the scope of the invention. The periphery of the upstanding wall 38 is threaded, the purpose of which is described below.

The intermediate structure 20 joins the support base to the component base and permits relative motion therebetween in nearly all directions. This allows a component supported by the bracket 10 to be positioned in nearly any desired orientation relative to an aircraft structural member. As best illustrated in FIG. 2, one embodiment of the intermediate structure 20 includes a ball-type connector 42, a locking collar 44, a stem 46, and a stem bayonet 48. The intermediate structure components may be used or combined in various manners as described herein to accommodate nearly any component mounting requirement.

Figure 7:
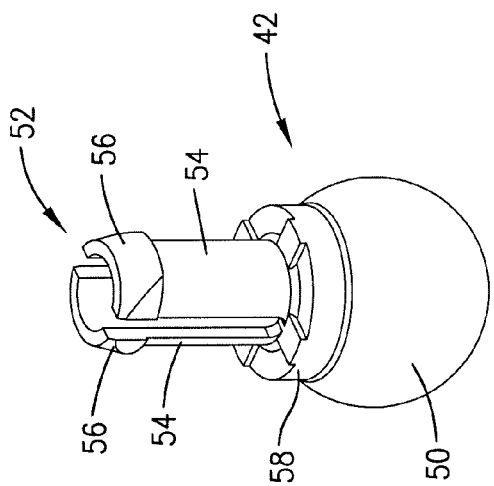
FIG. 7 is an isometric view of a ball connector of the bracket of FIG. 1.
Figure 12:
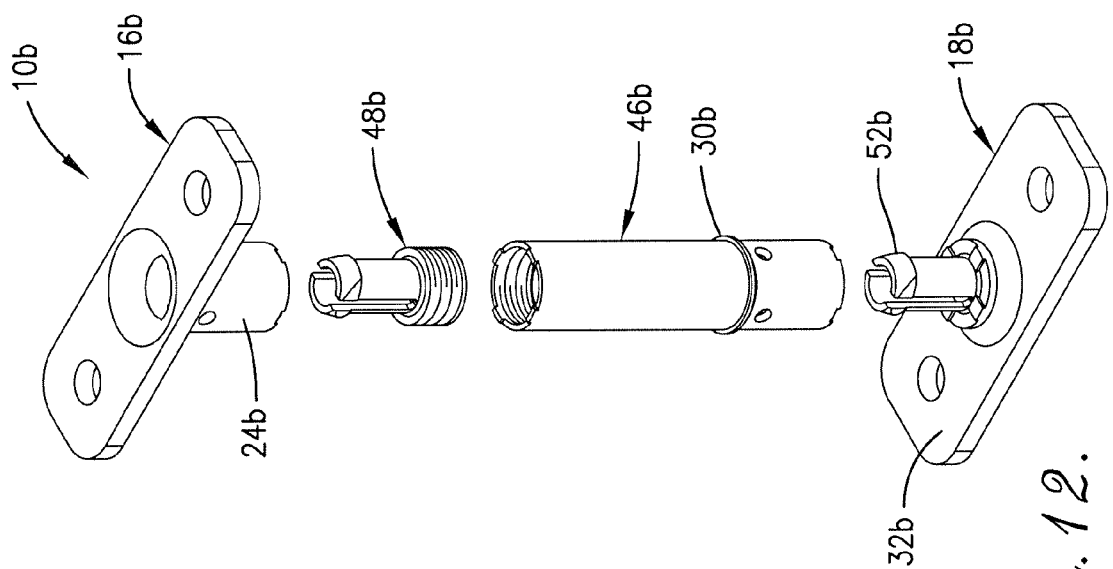
FIG. 12 is an exploded view of the bracket of FIG. 11.
Figure 11:
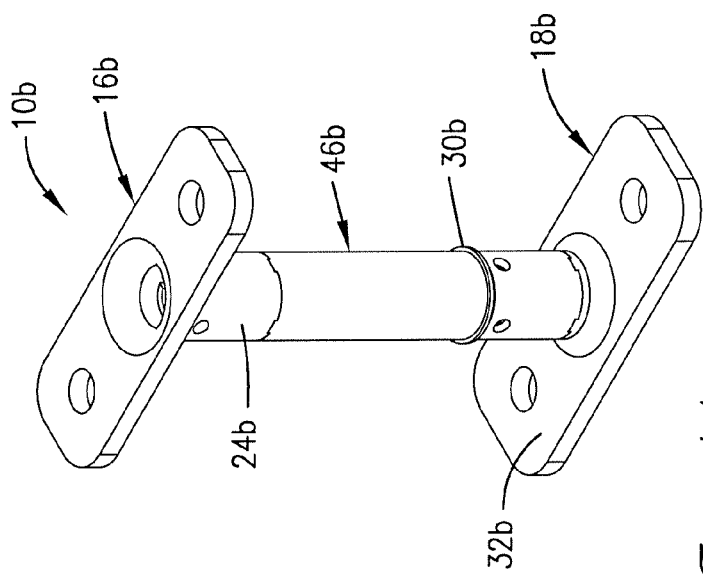
FIG. 11 is an isometric view of a bracket constructed in accordance with another embodiment of the invention.

The ball-type connector 42 is best illustrated in FIG. 7 and includes a spherical ball or knob 50 and a snap-fit connector 52 extending from one side of the ball. The ball 50 is sized and dimensioned to fit and rotate within the component base socket 34. One embodiment of the ball is between 0.5"-0.75" in diameter, but it may be formed in other shapes and sizes without departing from the scope of the invention.

The snap-fit connector 52 includes a pair of arcuate locking arms 54 separated by two parallel slits or channels. The distal ends of the locking arms may be temporarily pressed or otherwise biased together so as to fit within either the stem or the support base tubular post as described below. A locking ridge 56 extends from the distal end of each locking arm for engaging a corresponding internal retaining ridge within the stem. The ball-type connector 42 also includes an intermediate washer-shaped shoulder 58 positioned between the spherical ball and the locking arms. The shoulder 58 is notched as illustrated for mating with a similarly notched portion of the stem or support base as described below.

The locking collar 44 is provided for locking the ball-type connector 42 in the socket 34 so it does not move relative to the component base. The collar 44 fits over the ball connector 42 as shown in FIG. 1 and has internal threads for engaging the external threading on the component base socket 34. The periphery of the locking collar may be ribbed to facilitate gripping. When the collar 44 is loosened and/or entirely removed from the component base 18, the ball connector 42 and the component base 18 can move in nearly any direction relative to one another. Once the ball connector 42 and component base 18 have been positioned in a desired orientation relative to one another, the collar 44 may be tightly screwed onto the upstanding wall 38 to prevent further relative movement between the ball connector and the component base.

The stem 46 joins the ball connector 42 to the support base 16 and may be formed in various lengths depending on the desired degree of separation between the support base and the component base. For applications which require little separation between the support base and the component base, the ball type connector may be attached directly to the support base without a stem as discussed below.

The stem 46, which is best illustrated in FIG. 2, is tubular and has a diameter approximately the same as the diameter of the support base tubular post 24. The lower end of the stem is open to define a socket for receiving the snap-fit connector 52 of the ball connector. A retaining ridge is formed inside the stem for retaining the locking ridges 56 of the ball connector. The stem also includes several small holes 60 positioned just above the retaining ridge and extending between the stem's outer and inner circumferential surfaces. A tool may be inserted through these holes for releasing the snap-fit connector from the retaining ridge. The upper edge of the stem is notched to mate with the complementary notches of the support base. Similarly, the lower edge of the stem is notched to mate with the complementary notches of the ball connector.

The stem bayonet 48 is best illustrated in FIG. 6 and is configured to be inserted into the upper open end of the stem. One embodiment of the stem bayonet includes a cylindrical base 62 with external threading for mating with internal threading inside the top of the stem. Alternatively, the stem bayonet may be glued to or integrally formed with the stem. The stem bayonet includes a pair of locking arms 64 separated by two parallel slits or channels which permits the distal ends of the locking arms to be temporarily pressed or otherwise biased together so as to fit within the lower end of the support base tubular post 24. A locking ridge 66 extends from the distal end of each locking arm 64 for engaging the corresponding internal retaining ridge within the support plate post.

To use the bracket 10 to support a component to an aircraft structural member, it is typical (but not necessary) to first secure the support base 16 to the aircraft. To do so, conventional fasteners are inserted through the holes 26 in the mounting plate and into aligned holes formed in the structural member. Fasteners which require no tools, such as plastic snap-fit connectors, are preferred.

A stem 46 with an attached stem bayonet 48 is then inserted into the lower end of the tubular post 24 by biasing the distal ends of the locking arms 64 together until they fit within the post. As the locking arms are inserted into the post, the locking ridges 66 on the locking arms 64 snap over and are held in place by the retaining ridge within the post. When the stem bayonet is fully seated within the post, the notches on the tubular post nest within the notches on the upper end of the stem as shown in FIG. 1. Stems of various lengths are preferably provided so that a user may assemble a bracket with a desired amount of separation between the support base and the component base. As mentioned above, no stem is required when less spacing is desired between the support base and the component base.

Next, the ball connector 42 is placed in the component base socket 34 and the locking collar 44 is placed over the ball and threaded onto the perimeter of the socket wall 38. The snap-fit connector 52 is then inserted into the lower end of the stem 46, or the lower end of the tubular post 24 of the support base 16 when no stem is used, by biasing the distal ends of the locking arms 54 together until they fit within the stem or post. As the locking arms are inserted into the stem or post, the locking ridges 56 on the locking arms snap over and are held in place by the retaining ridge within the stem or post. When the snap-fit connector is fully seated within the stem or post, the notches on the shoulder 58 of the ball connector 42a nest within the notches on the lower end of the stem or the lower end of the post as shown in FIG. 1.

Once the component base 18 has been secured to the support base 16 by the intermediate structure 20, a base saddle and ECS duct or any other component may be attached to the component base with zip ties, rivets, screws, wing nuts or any other fasteners placed in the holes 36 of the component base. The component secured to the component base may then be oriented relative to the support base by unscrewing the locking collar 44 from the socket 34 and moving the component base relative to the ball-type connector. Once the component and component base 18 have been moved to a desired position, the locking collar 44 may be tightly threaded onto the socket of the component base to "lock" the component and component base into the desired position.

To remove the stem 46 from the support base 16, a tool (such as a needle nose pliers) may be inserted into the holes 28 of the post 24 to bias the locking arms 64 of the stem 48 together so that the retaining ridges 66 on the locking arms can slide over the retaining ridge within the post 24 of the support base 16. The ball-type connector 42 may be removed from the stem 46, or from the post 24 of the support base when no stem is used, in a similar fashion.

Figure 9:
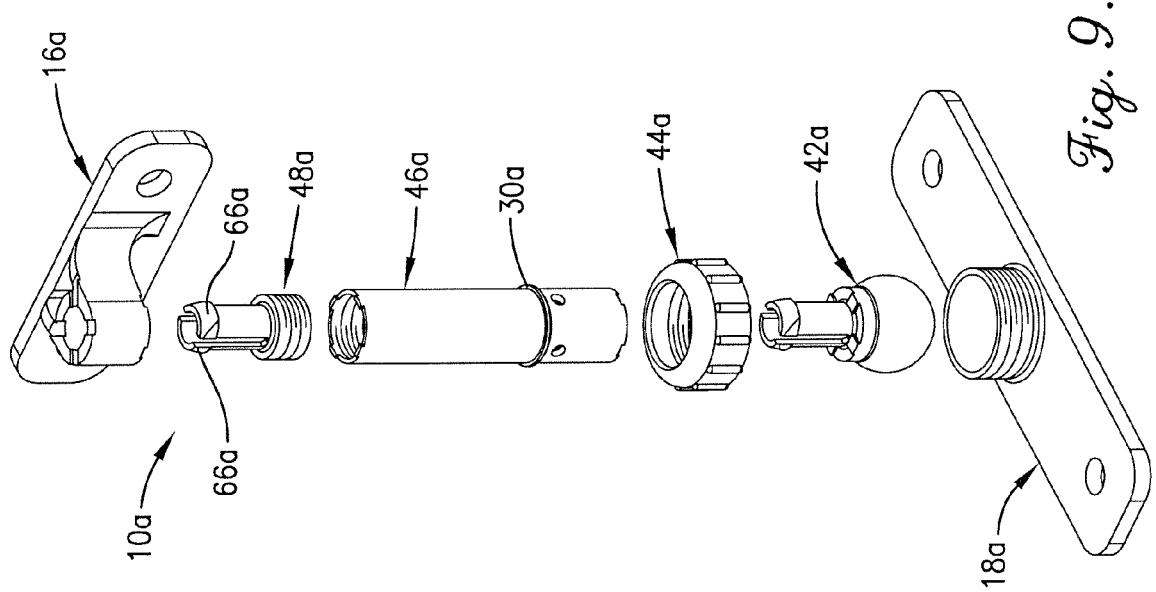
FIG. 9 is an exploded view of the bracket of FIG. 8.
Figure 8:
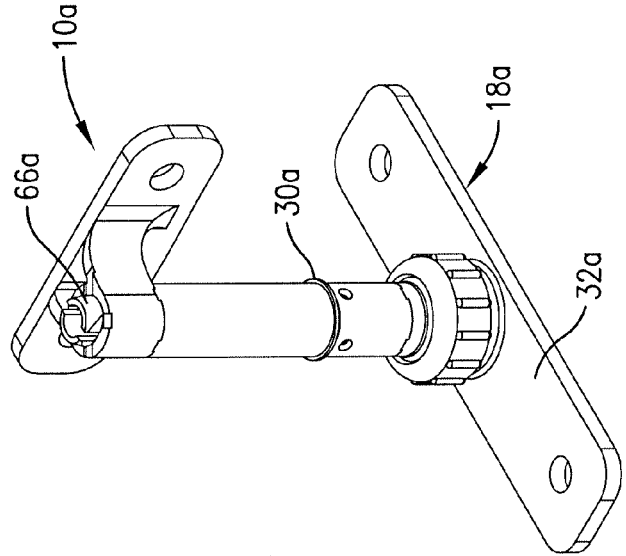
FIG. 8 is an isometric view of a bracket constructed in accordance with another embodiment of the invention.
Figure 10:
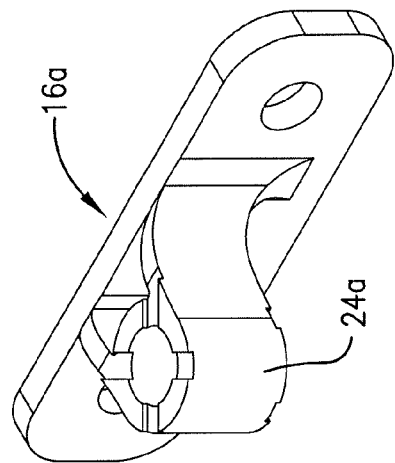
FIG. 10 is an isometric view of a support base of the bracket of FIG. 8.
Figure 15:
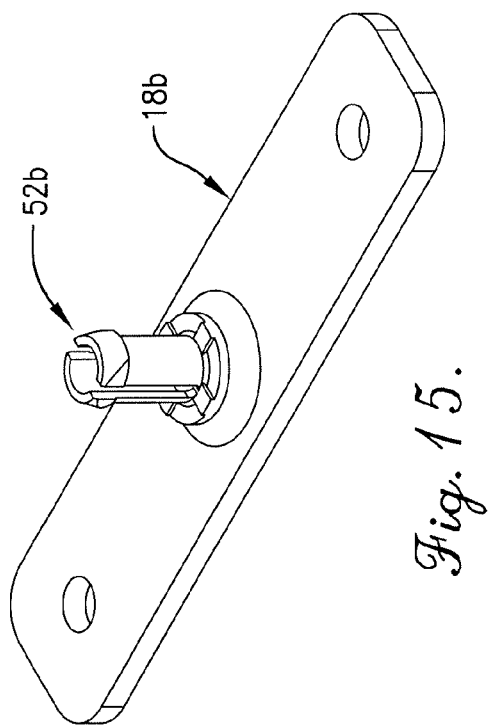
FIG. 15 is an isometric view of a component base of the bracket of FIG. 12.
Figure 14:
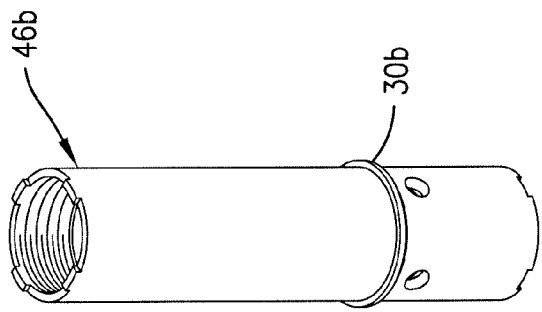
FIG. 14 is an isometric view of a stem of the bracket of FIG. 12.
Figure 13:
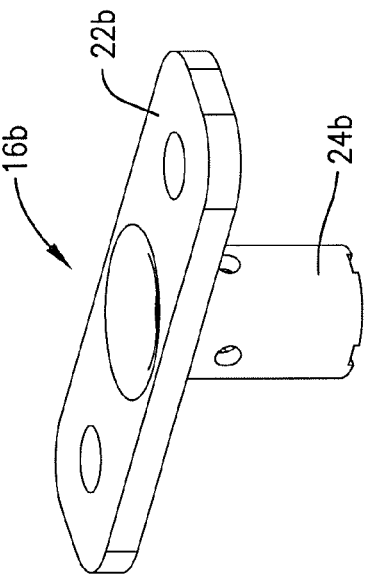
FIG. 13 is an isometric view of a support base of the bracket of FIG. 12.
Figure 18:
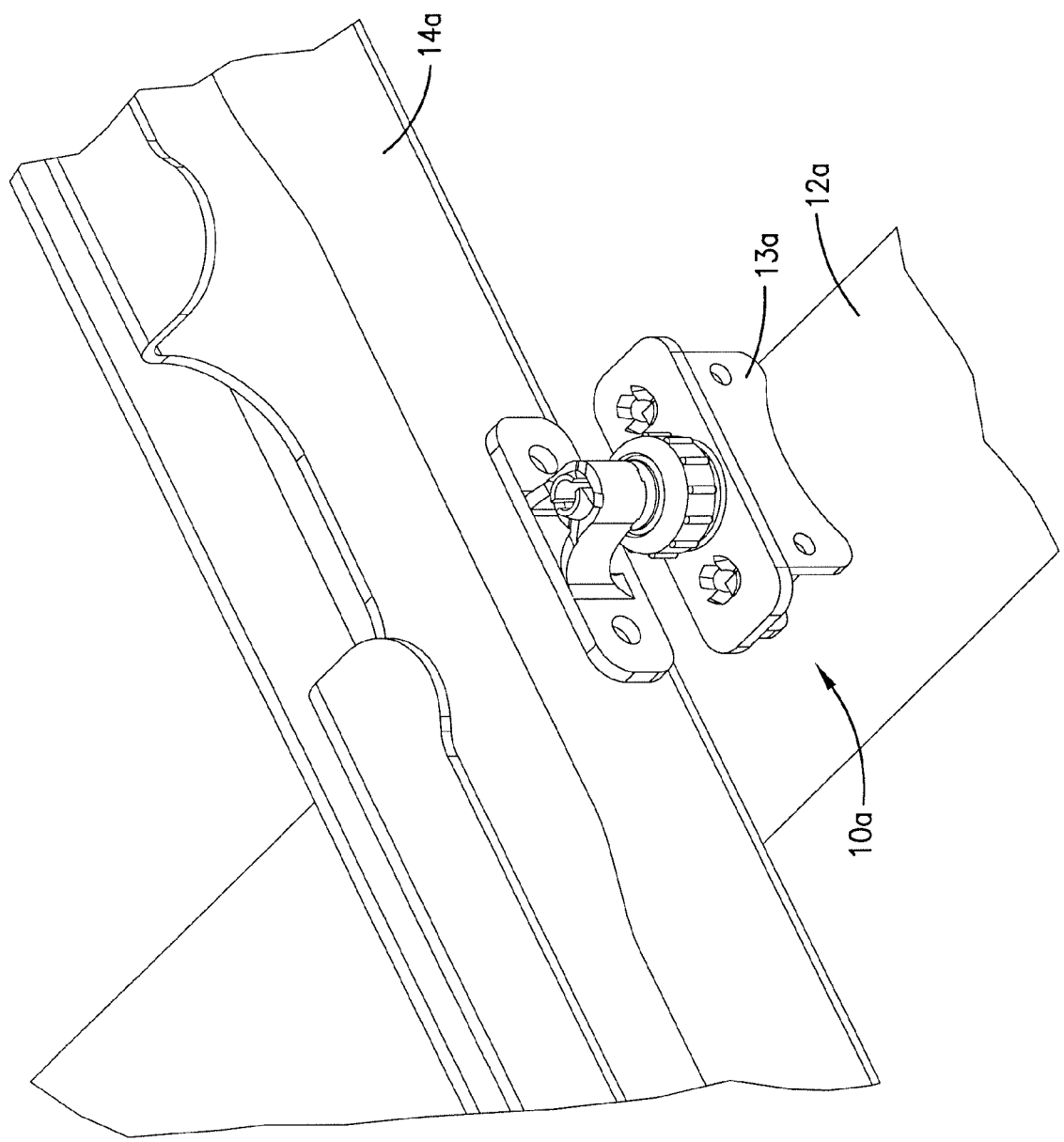
FIG. 18 is a perspective schematic view depicting attachment of the bracket of FIG. 8 without a stem between a support member of an aircraft and a ECS duct or other component.

FIGS. 8-10 illustrate an alternative embodiment of the bracket denoted by the numeral 10a. The bracket 10a is substantially similar to the bracket 10 of FIGS. 1-7 with similar components being identified with the same numerals followed by "a". The support base 16a of the bracket 10a is best illustrated in FIG. 10 and includes a shorter tubular post 24a which decreases the distance between the support base and the component base. The shorter tubular post also eliminates the need for the internal retaining ridge and corresponding holes in the post because the locking ridges 66a of the stem bayonet 48a extend all the way through the tubular post 24a and engage the top edge of the tubular post when the stem and stem bayonet are fully inserted into the support base. Because the tubular post is shorter, the circumferential ridge or lip 30a for engaging an insulation blanket retainer is placed on the stem rather than the post. Another difference is that the mounting plate 32a of the component base 18a may be longer to support larger components such as larger diameter ECS ducts. FIG. 18 illustrates the bracket 10a being used to mount a hose saddle 13a and ECS duct 12a to an aircraft structural member 14a.

Figure 17:
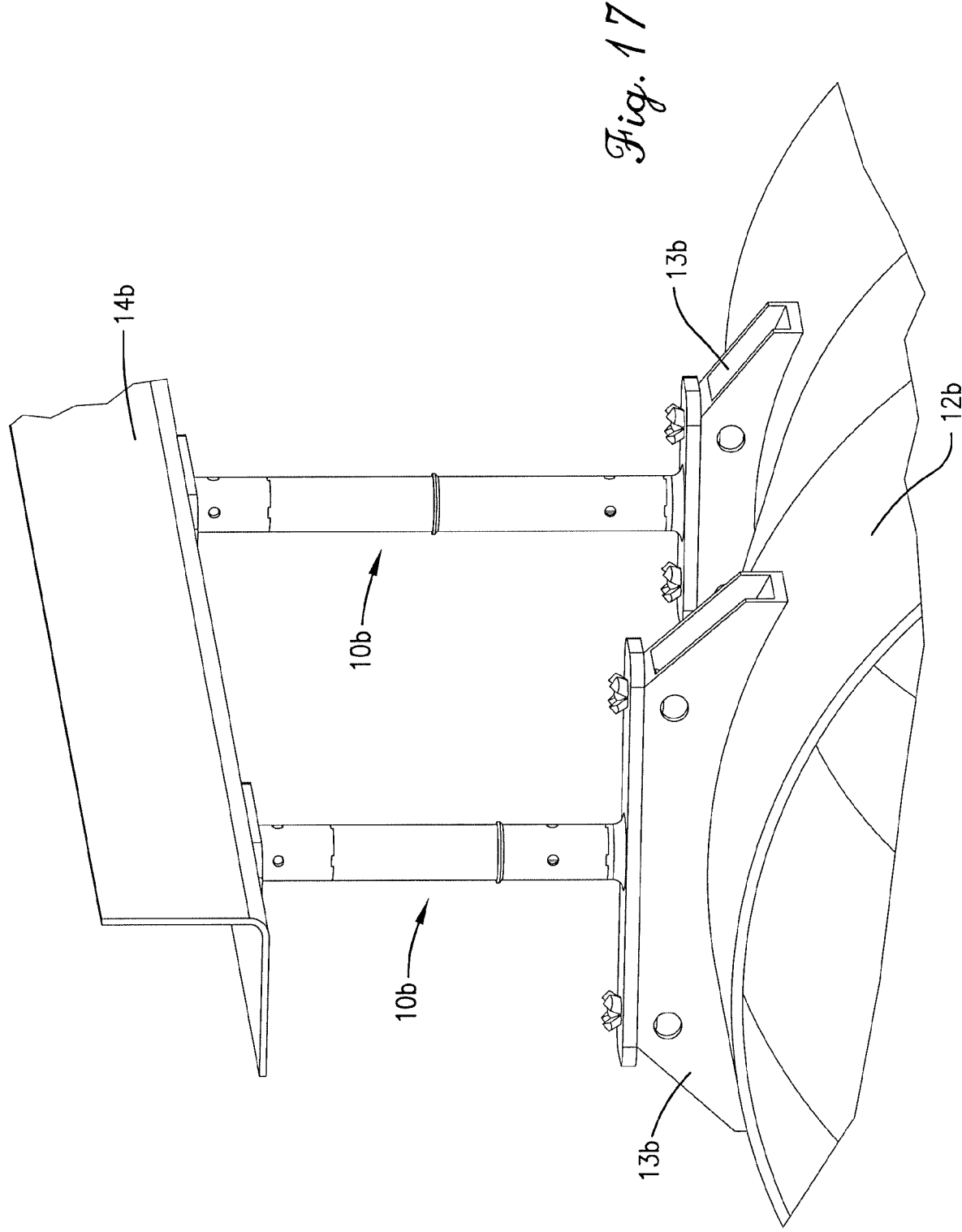
FIG. 17 is a perspective schematic view depicting attachment of the bracket of FIG. 11 between a support member of an aircraft and a ECS duct or other component.

FIGS. 11-15 illustrate another alternative embodiment of the bracket denoted by the numeral 10b. The bracket 10b is similar to the bracket 10 of FIGS. 1-7 with similar components being identified with the same numerals followed by "b". The main difference between the bracket 10b and the bracket 10 is that no ball and socket joint is used. Instead, the component base 18b includes a snap-fit connector 52b which fits directly within the lower end of the stem 46b, or the tubular post 24b of the support base 16b when no stem is used. Another difference is that the support base 16b has a mounting plate 22b that is parallel to the mounting plate 32b of the component base 18b. In contrast, the support base 16 of the bracket 10 of FIGS. 1-7 is generally perpendicular to its component base 18. FIG. 17 illustrates a pair of the brackets 10b being used to mount two hose saddles 13b and an ECS duct 12b to an aircraft structural member 14.

In all of the embodiments of the bracket, the various components described herein may be used and combined in various manners to accommodate nearly any mounting requirement. For example, when components must be spaced relatively further from an aircraft support member, a bracket with a longer stem may be used. Conversely, when components are desirably positioned closer to an aircraft support member, a shorter stem may be used, the stem may be omitted entirely, and/or the bracket illustrated in FIGS. 8-10 may be used. When it is desired to mount a component to an aircraft structural member which extends generally perpendicular to the outer wall of the aircraft fuselage, a support base such as the ones illustrated in FIGS. 1-3 and 8 and 9 may be used. Conversely, when it is desired to mount a component to an aircraft structural member which is substantially parallel to the outer wall of the aircraft fuselage, a support base such as the one illustrated in FIGS. 11-13 may be used. These are merely a few examples of mounting configurations which may be accommodated with the present invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A bracket for supporting a component from a structural member of an aircraft, the bracket comprising:
   a support base configured to be attached to the structural member of the aircraft, the support base including a socket;
   a component base configured to be attached to the component, the component base including a mounting plate, a socket extending from the mounting plate, and external threads; and
   intermediate structure for joining the support base to the component base, the intermediate structure comprising:
      a ball connector for receipt within the socket of the component base, forming a ball-and-socket joint between the component base and the intermediate structure, wherein the ball connector includes a snap-fit connector for receipt within the socket of the support base,
      a stem placed between the ball connector and the support base for increasing a distance between the support base and the component base, and
      a collar configured for locking the ball connector in the socket of the component base, wherein the collar comprises internal threads operate to engage with the external threads of the component base,
   wherein the support base comprises a mounting plate that extends generally perpendicularly relative to the mounting plate of the component base.

2. The bracket as set forth in claim 1, wherein the support base, the component base, and the intermediate structure are all formed of injection molded thermoplastic material.

3. A bracket system comprising:
   a parallel support base comprising a mounting plate and a post with a longitudinal axis that extends generally parallel to a plane occupied by the mounting plate of the parallel support base;
   a perpendicular support base comprising a mounting plate and a post with a longitudinal axis that extends generally perpendicular to a plane occupied by the mounting plate of the perpendicular support base;
   a component base comprising a mounting plate and a socket with a longitudinal axis that extends generally perpendicular to a plane occupied by the component base mounting plate;
   at least one intermediate structure having a first end and a second end, wherein at least one of the first end and the second end are configured to detachably connect with at least one of the parallel support base and the perpendicular support base;
   a ball connector comprising a spherical portion and a connector portion extending radially outward from the spherical portion,
   wherein the spherical portion is shaped and sized to rotatably and pivotally couple with the component base socket and the connector portion is configured to detachably connect with each and every one of the parallel support base, the perpendicular support base, and the at least one intermediate structure.

4. The bracket system of claim 3, wherein the at least one intermediate structure comprises a long stem and a short stem.

\* \* \* \* \*